United States Patent
Oka et al.

[11] Patent Number: 5,947,220
[45] Date of Patent: Sep. 7, 1999

[54] SNOWMOBILE

[75] Inventors: Yoshio Oka; Kazuhiro Yamamoto, both of Saitama, Japan

[73] Assignee: Honda Giken Kogyo Kabsuhiki, Tokyo, Japan

[21] Appl. No.: 08/800,505

[22] Filed: Feb. 14, 1997

[30] Foreign Application Priority Data

Feb. 16, 1996 [JP] Japan .................................. 8-053760

[51] Int. Cl.$^6$ ................................................. B62M 27/02
[52] U.S. Cl. ............................................................ 180/193
[58] Field of Search ..................................... 180/182, 186, 180/190, 193, 9.5, 9.52, 9.54, 9.56, 9.58, 9.6

[56] References Cited

U.S. PATENT DOCUMENTS

| 3,707,198 | 12/1972 | Pierson | 180/193 |
|---|---|---|---|
| 3,944,005 | 3/1976 | Tomita | 180/193 |
| 3,966,004 | 6/1976 | Rose . | |
| 4,093,033 | 6/1978 | Rosch . | |
| 4,314,618 | 2/1982 | Tamura | 180/193 |
| 5,370,198 | 12/1994 | Karpik | 180/193 |
| 5,730,242 | 3/1998 | Furusawa | 180/193 |

FOREIGN PATENT DOCUMENTS 51-14628   2/1976   Japan .

*Primary Examiner*—Kevin Hurley

[57] ABSTRACT

To make a rear cushion device compact and lightweight, a rear cushion device is accommodated inside a track belt of an endless track device and includes a separate damper and cushion spring. The damper is slightly inclined downward towards the front side and is supported at its upper end by a floor. The cushion spring is positioned substantially upright in its compressed state.

18 Claims, 13 Drawing Sheets

SNOWMOBILE

BACKGROUND OF THE INVENTION

1. Field of the Invention

The present invention relates to a snowmobile having a steerable ski supported by a front portion of a vehicle body and an endless track device supported by a rear portion of the vehicle body. More particularly, this invention relates to improvements in the rear suspension of a snowmobile.

2. Description of Background Art

A conventional rear suspension for a snowmobile including a rear cushion device consisting of a damper coaxially located within a cushion spring that is provided between the swing arm and the side rail is disclosed in U.S. Pat. No. 4,093,033.

The '033 patent also discloses a conventional endless track device for a snowmobile which includes a drive wheel, a swing arm pivotally supported to a vehicle body, a side rail supported to a rear end of the swing arm and extending in a longitudinal direction of the vehicle body, idlers supported to a front portion and a rear portion of the side rail, and an endless track belt wrapped around the idlers and the drive wheel. In the '033 patent, the side rail is formed with a slider extending in the longitudinal direction for slidably guiding the endless track belt. The front end of the slider extends to a position in the vicinity of the drive wheel.

Further, another conventional endless track device employing a torsion spring for the cushion spring is described in Japanese Patent Laid-open No. Sho 51-14628.

When an impact load is applied from a snow surface to the side rail of the endless track device during operation of the snowmobile, the swing arm is swung upward. This swing of the swing arm due to the impact load must be absorbed by the cushion spring and the damper.

Because the endless track device has a low height, the rear cushion device is conventionally arranged nearly horizontally. As a result, a large damping force must be exerted by the damper to counteract the swing arm movement. For the same reason, the stroke of the damper is reduced. Accordingly, a high-load cushion spring and link mechanism are required in the conventional snowmobile which results in increased weight.

If a torsion spring is used as the cushion spring, a similar weight problem occurs because, in general, torsion springs are heavier than coil springs.

Another problem which occurs in the conventional snowmobile is the instability of the cushion spring due to contact of individual spring elements or deviation of the coil center.

SUMMARY AND OBJECTIONS OF THE INVENTION

An object of the present invention is to solve the above-mention problems of the conventional snowmobile.

It is another object of the invention to make a rear cushion device compact and lightweight.

It is a further object of the invention to accommodate a rear cushion device inside a track belt of an endless track device, It is yet another object of the invention to separate the rear cushion device into a damper and an independent cushion spring wherein the damper is slightly inclined downward to the front side and supported at its upper end to a floor and the cushion spring is positioned substantially-upright in its compressed condition.

These objects are achieved by providing a snowmobile including an endless track device having a drive wheel supported to a vehicle body, a swing arm pivotally supported by a front end thereof to the vehicle body, a side rail connected through a shaft to a rear end of the swing arm and extending in a longitudinal direction of the vehicle body, first and second idlers supported to at least a front portion and a rear portion of the side rail, and a track belt wrapped around the first and second idlers and the drive wheel, and also including a rear cushion device for absorbing a shock from a snow surface; wherein a damper and a cushion spring of the rear cushion device are separated from each other, the damper is inclined in the longitudinal direction, and the cushion spring is positioned substantially upright in its compressed condition.

The invention also utilizes a common lower supporting member which commonly supports both the damper and the cushion spring. Further, a rubber stopper is provided on the side rails and abuts against the vehicle body in the compressed state of the cushion spring.

Further, an upper member supported at opposite ends thereof to the vehicle body and extending in the longitudinal direction may be provided inside an upper portion of the track belt. An upper end of the damper may be supported by one end of the upper member, and a spring retaining portion for supporting an upper end of the cushion spring may be provided at the other end of the upper member.

Further, the upper member may have a flat upper surface, and a slider may be provided on the flat upper surface so as to extend along the inner surface of the upper portion of the track belt. Further, a heat exchanger may be located above the upper member with the upper portion of the track belt interposed therebetween.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
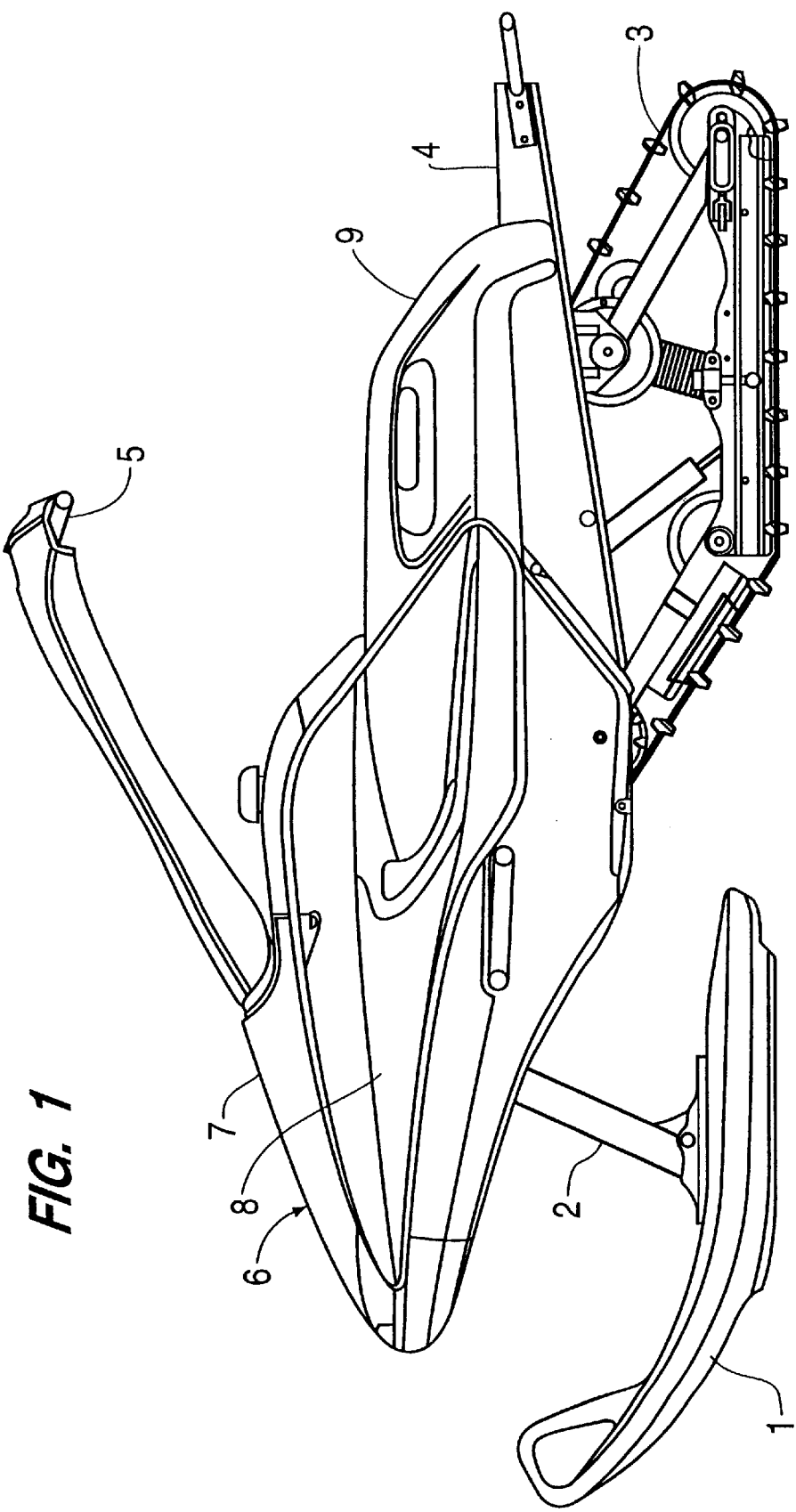
FIG. 1 is a side view of a snowmobile according to the present invention.

Hereinafter, a preferred embodiment of the present invention will be described with reference to the drawings with like reference numerals indicating like elements.

Figure 2:
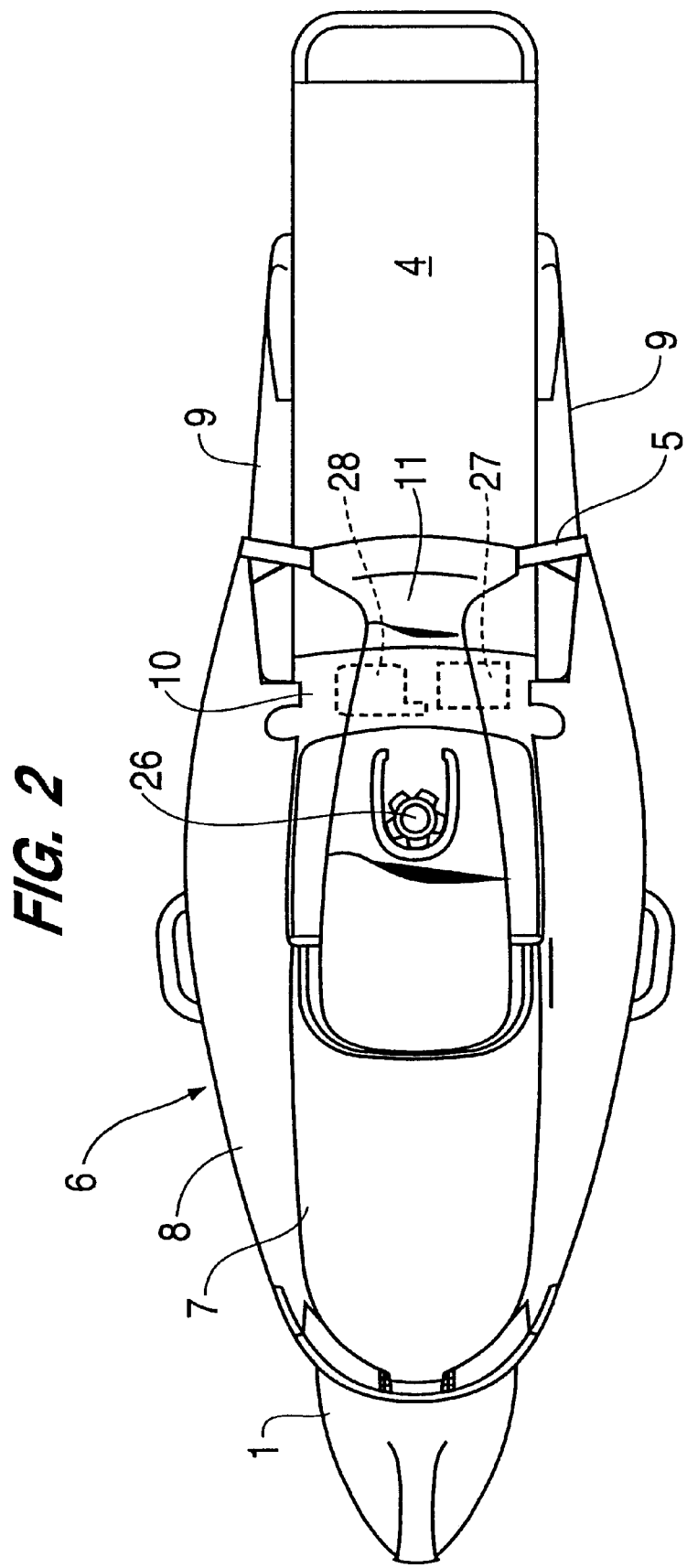
FIG. 2 is a top plan view of the inventive snowmobile.
Figure 3:
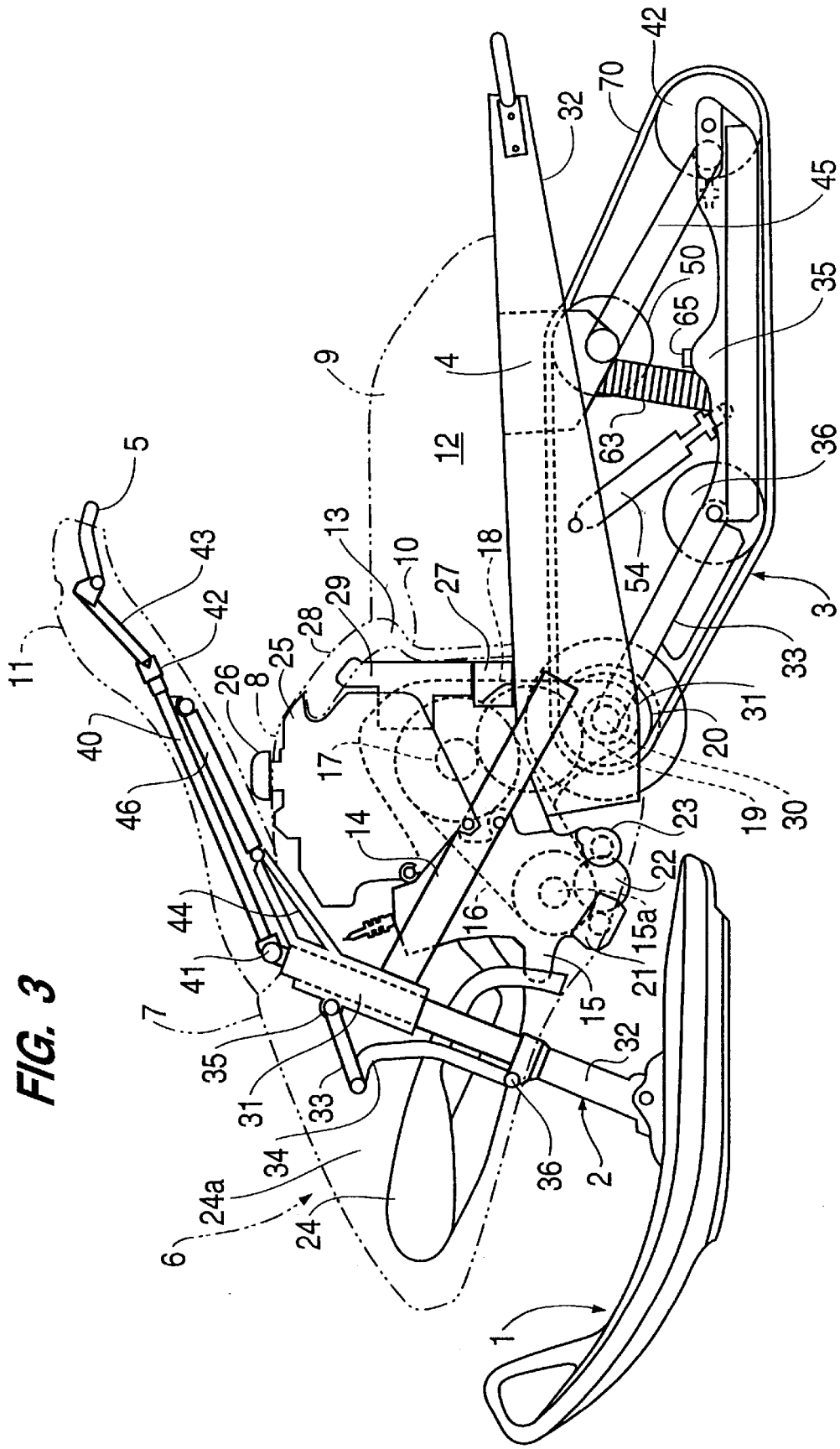
FIG. 3 is a side view of the inventive snowmobile with a vehicle body cover removed.

As mentioned above, FIG. 1 shows a side view of a snowmobile according to a preferred embodiment of the present invention, FIG. 2 shows a top plan view of the snowmobile, and FIG. 3 shows a side view of a vehicle body of the snowmobile with a body cover removed.

As apparent from FIGS. 1 and 2, a steerable ski 1 is supported through a front suspension 2 to a front portion of a vehicle body of the snowmobile, and an endless track device 3 is provided at a rear portion of the vehicle body. The endless track device 3 is driven by the motive power of an engine 15 to be hereinafter described.

A floor 4 is provided above the endless track device 3, and handlebars 5 are operated by an operator who is standing, kneeling or sitting on the floor 4.

The front portion of the vehicle body is covered with a body cover 6. The body cover 6 includes a front cover 7 elongated in the longitudinal direction for covering an upper central portion of the vehicle body and a side cover 8 for covering opposite side portions of the vehicle body.

As apparent from FIGS. 2 and 3, a pair of rear portions 9 of the side cover 8 extend along the right and left sides of the floor 4. In FIGS. 2 and 3, reference numeral 10 denotes a lid, and reference numeral 11 denotes a handle cover.

As apparent from FIG. 3, the vehicle body is partitioned into an operator space 12 defined above the floor 4 and an engine room 13 defined in front of the operator space 12.

A pair of right and left main frame members 14 extending in the longitudinal direction are provided in the engine room 13 and an engine 15 is supported to the main frame members 14. The motive power of the engine 15 is output from a crankshaft 15a through a belt-type continuous variable transmission 16 and transmitted through gear trains 17, 18, and 19 to a pair of right and left drive wheels 20 of the endless track device 3.

The engine 15 is provided with an oil pump 21, a balancer 22, and a water pump 23. An exhaust chamber 24a is defined in front of the engine 15 to accommodate an exhaust pipe 24. The exhaust pipe 24 has an exhaust gas output exposed to the lower side of the body cover 6.

The right and left main frame members 14 are welded at their rear end portions to the right and left side surfaces of a front end portion of the floor 4 having a substantially inverted U-shaped cross section.

A fuel tank 25 is supported by an upper portion of the engine 15, and a fuel filler cap 26 of the fuel tank 25 is exposed by an upper central portion of the side cover 8.

The side cover 8 extends from the front end of the vehicle body along the upper side of the fuel tank 25 to the rear side of the fuel tank 25. The rear portion of the side cover 8 covering the rear side of the fuel tank 25 is formed with an opening for maintenance. This opening may be closed by the lid 10.

A battery 27 and an oil tank 28 are provided under the lid 10. Reference numeral 29 denotes an oil filler cap which is removably attached to the oil tank 28.

The endless track device 3 will now be described in detail. The drive wheels 20 are supported and driven by a drive shaft 30. Brake disks 31 are coaxially mounted to the drive shaft 30. With this arrangement, a low center of mass can be ensured which results in a sufficient bank angle for sharp turns.

Figure 4:
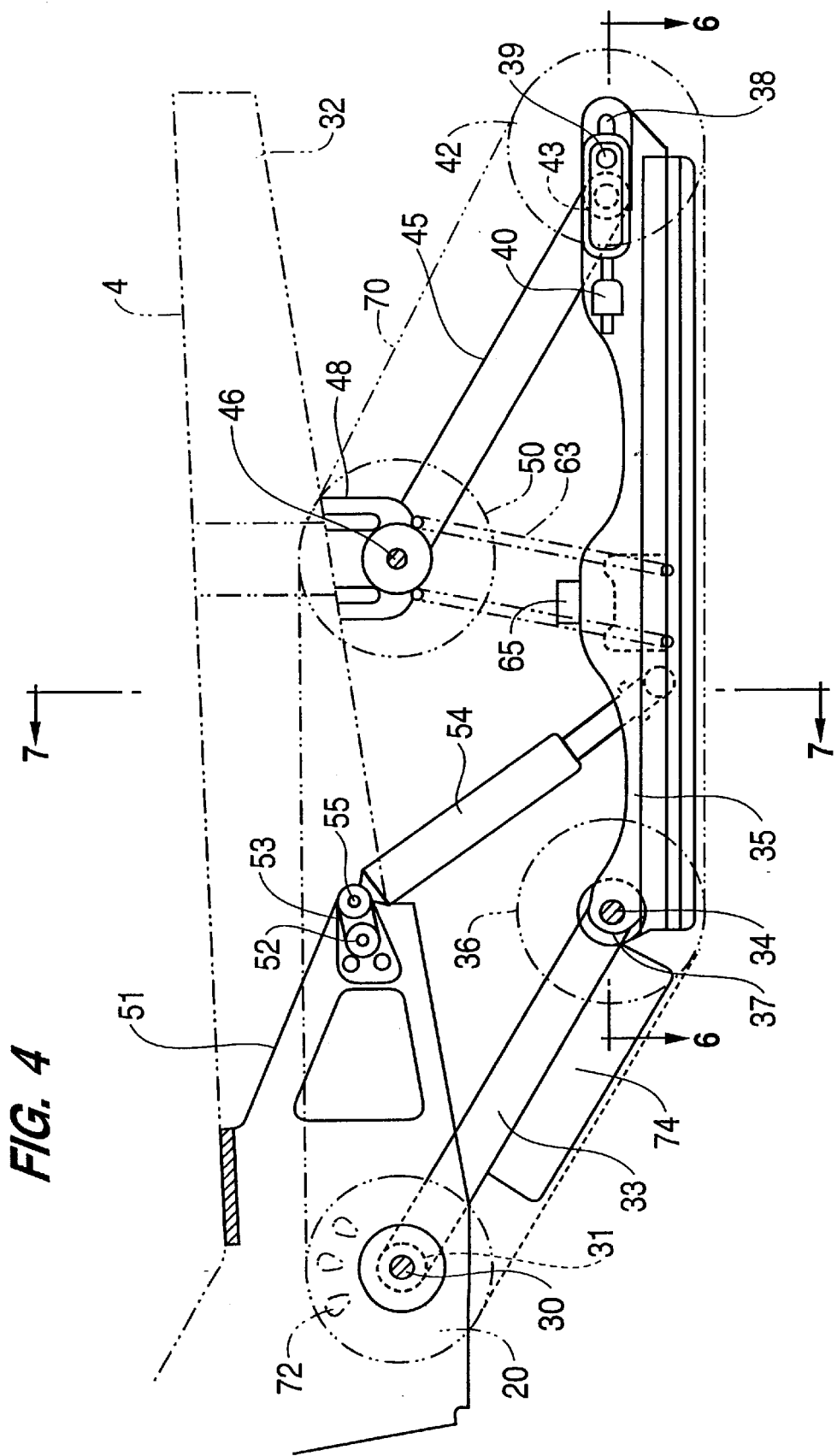
FIG. 4 is a close-up side view of the rear suspension and endless track device in a normal, unloaded state according to a preferred embodiment of the present invention.
Figure 5:
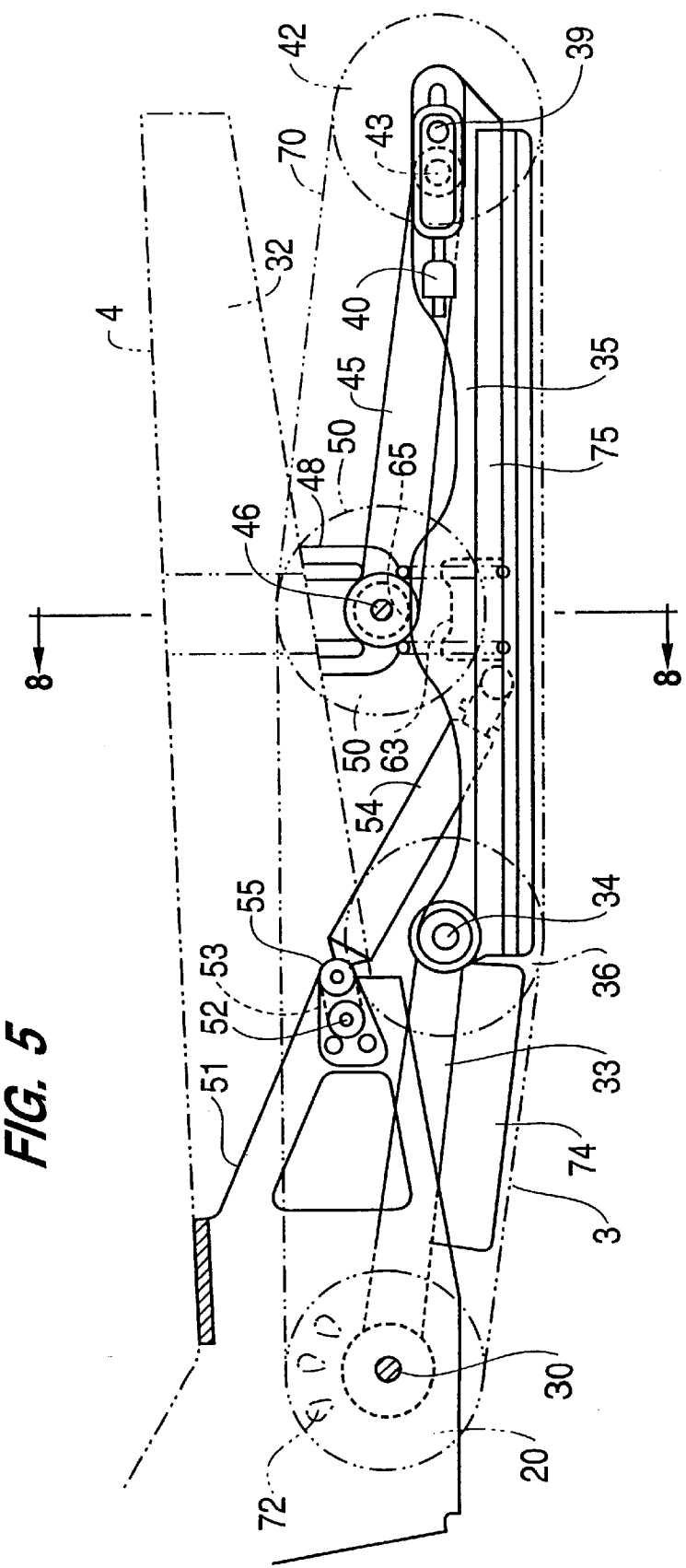
FIG. 5 is a view similar to FIG. 4, showing a high-load state.
Figure 6:
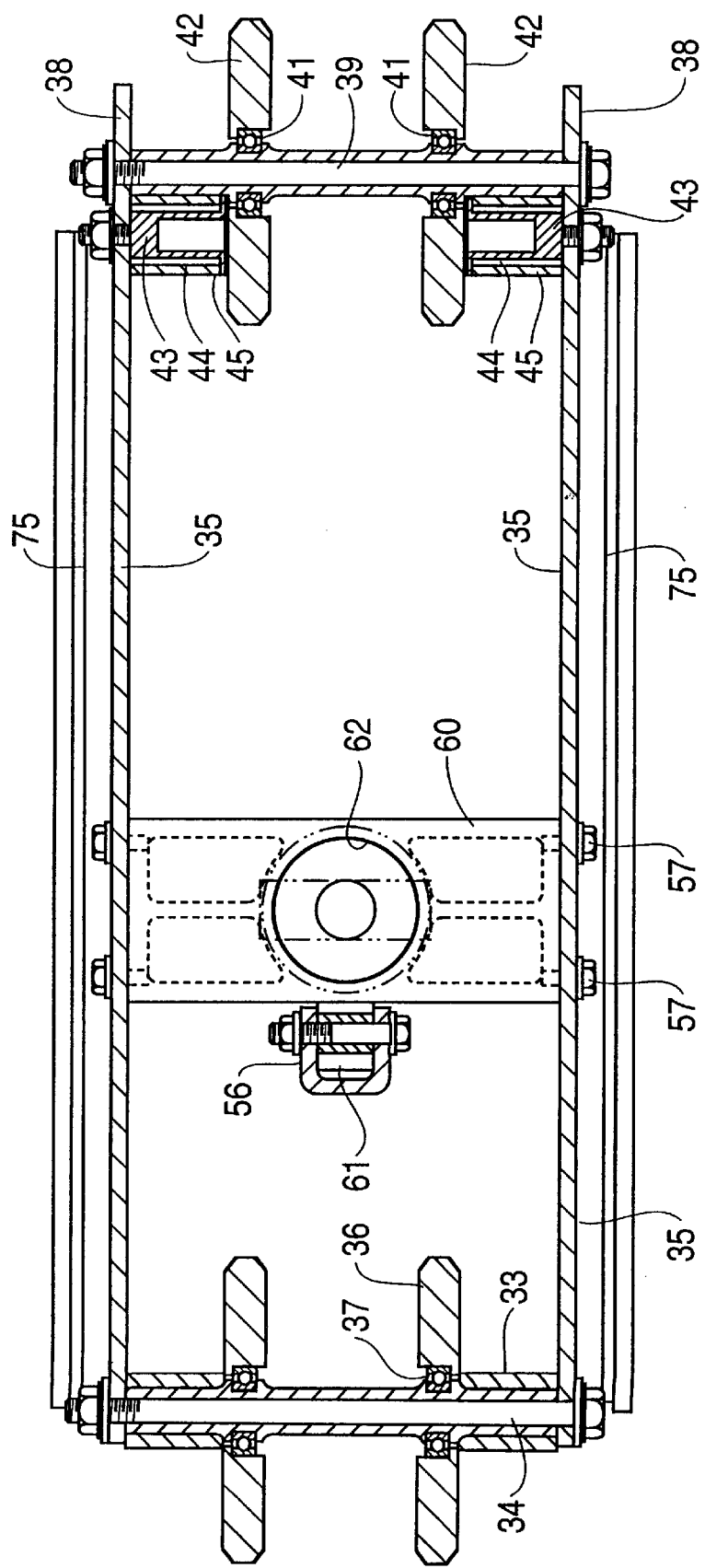
FIG. 6 is a cross section taken along the line 6—6 in FIG. 4.
Figure 7:
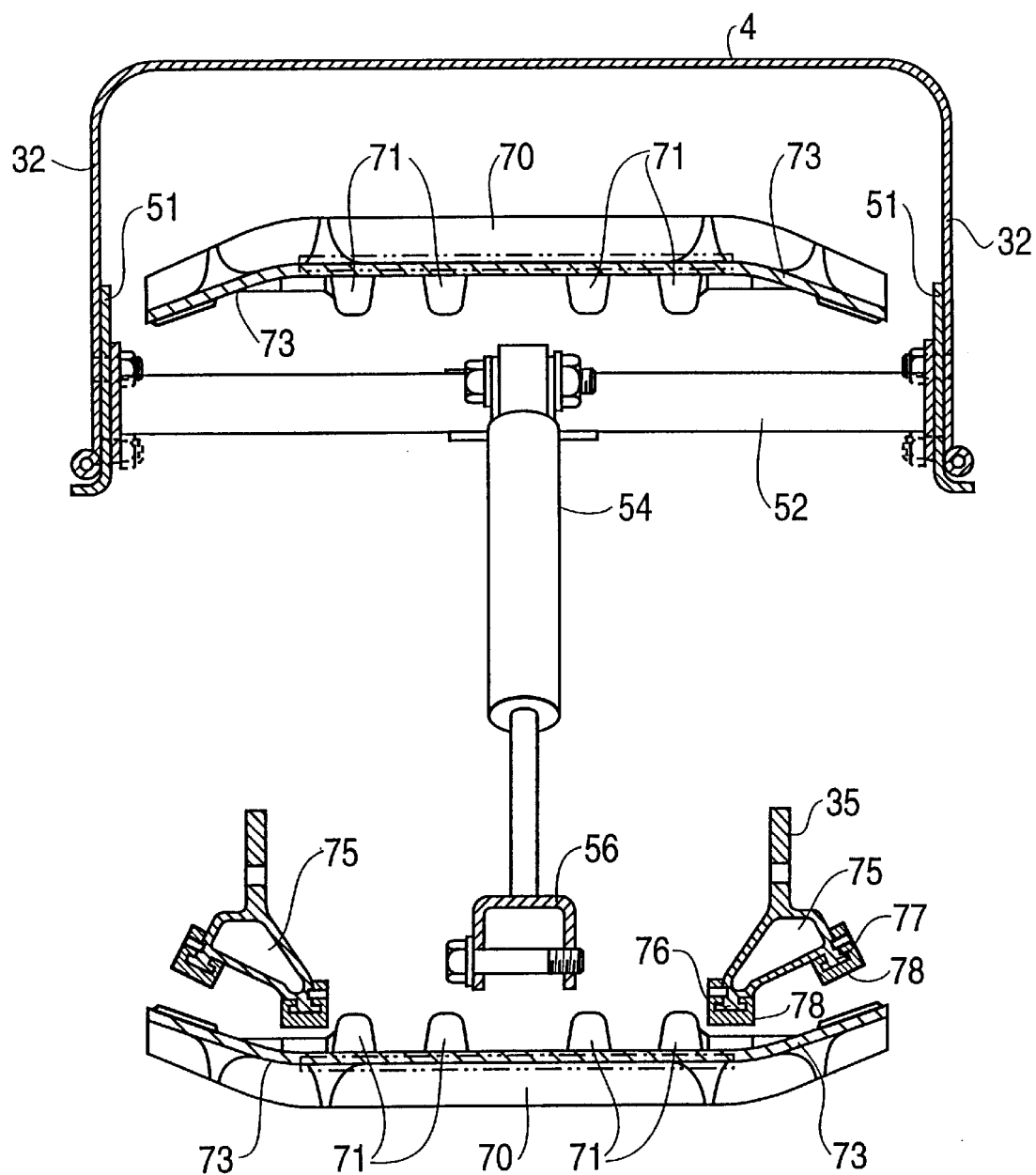
FIG. 7 is a cross section taken along the line 7—7 in FIG. 4.
Figure 8:
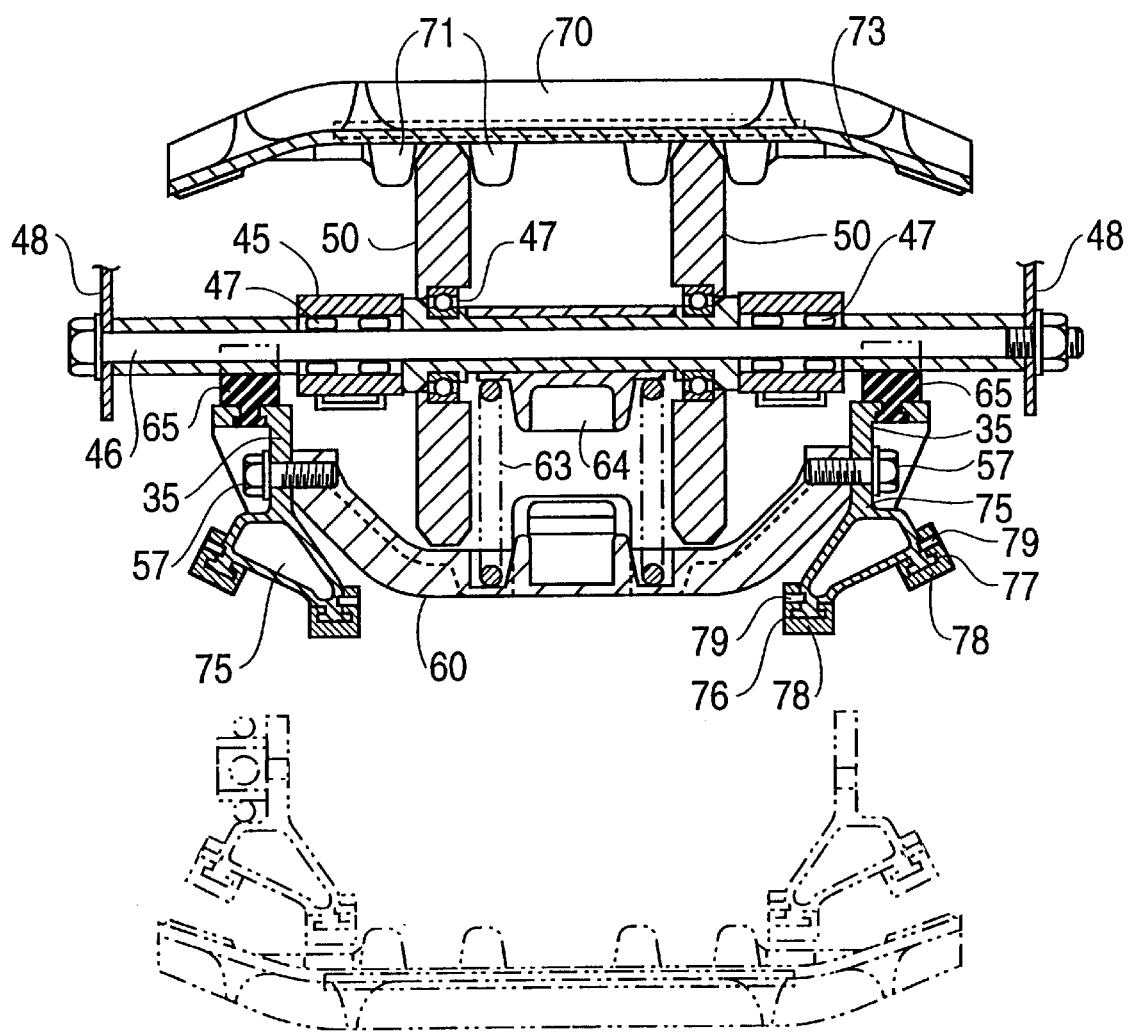
FIG. 8 is a cross section taken along the line 8—8 in FIG. 5.
Figure 9:
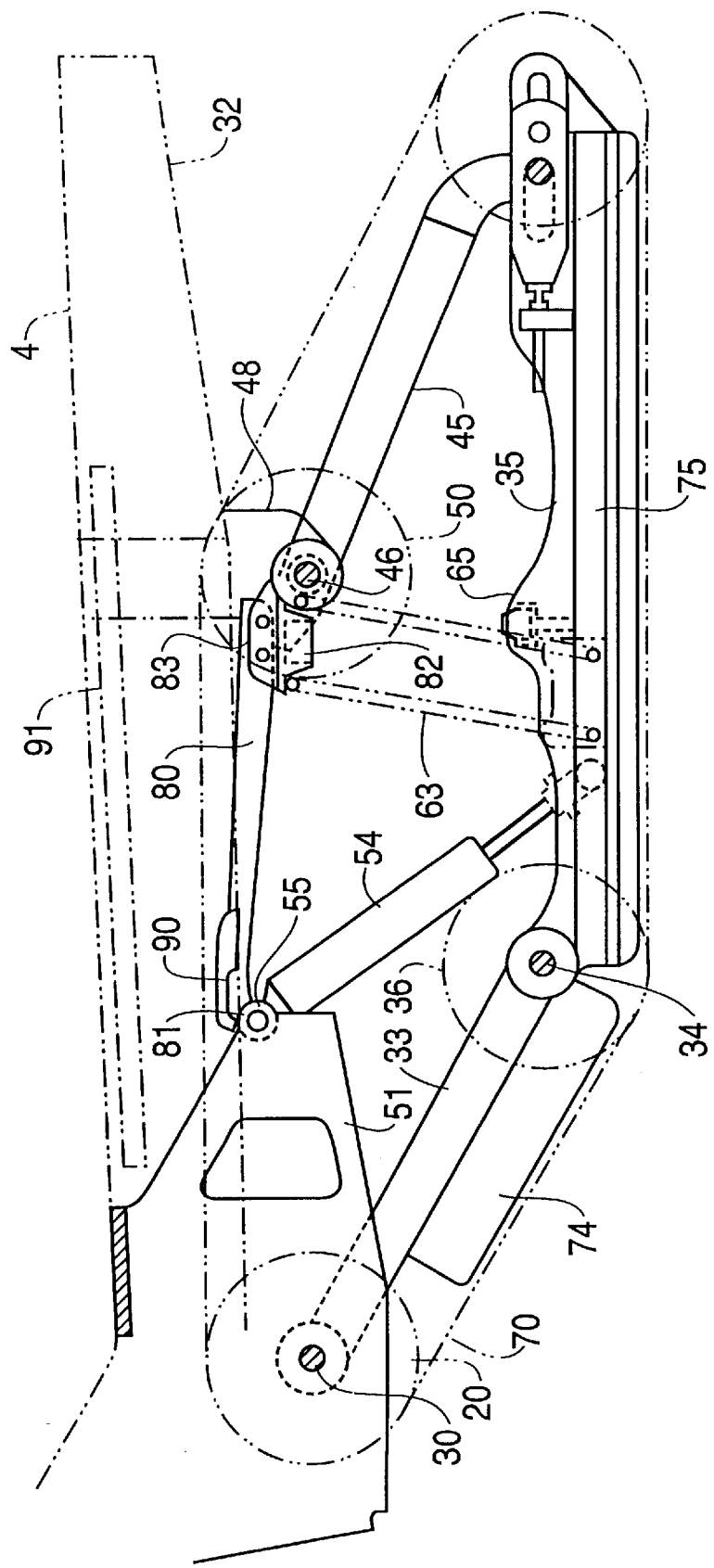
FIG. 9 is a view similar to FIG. 4, showing a modified form of the present invention.
Figure 10:
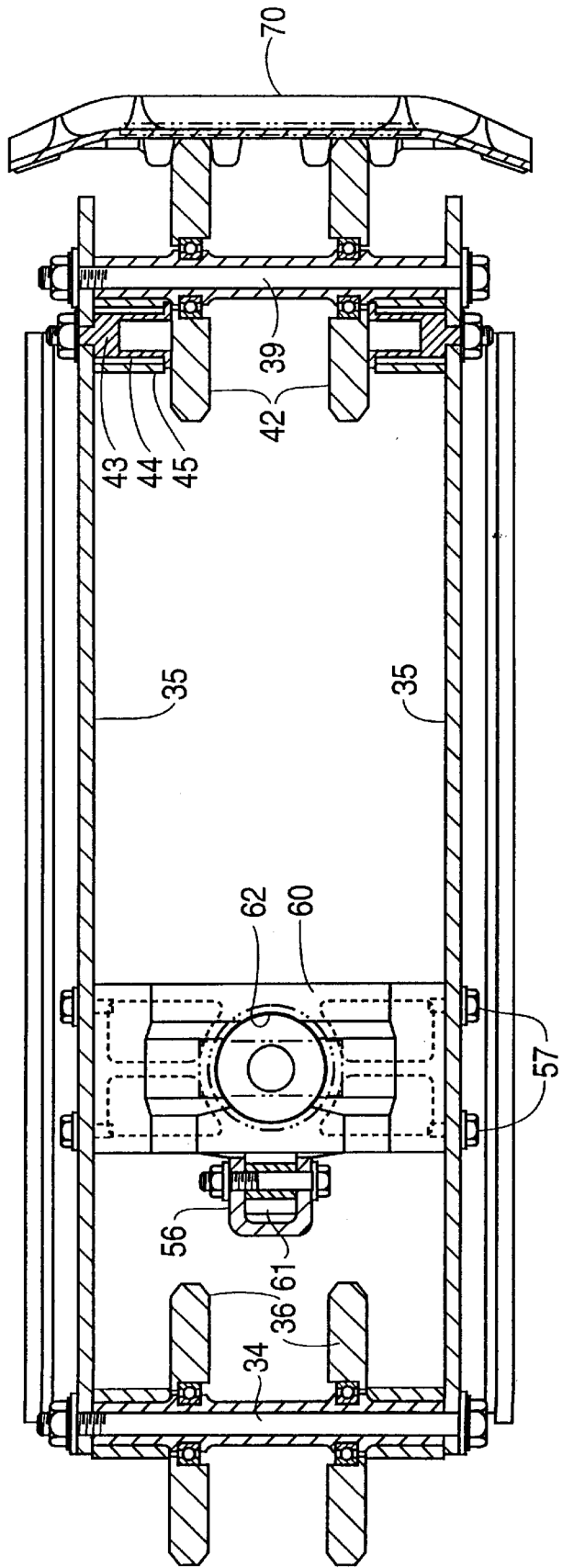
FIG. 10 is a view similar to FIG. 6, showing the modified form of the present invention.
Figure 11:
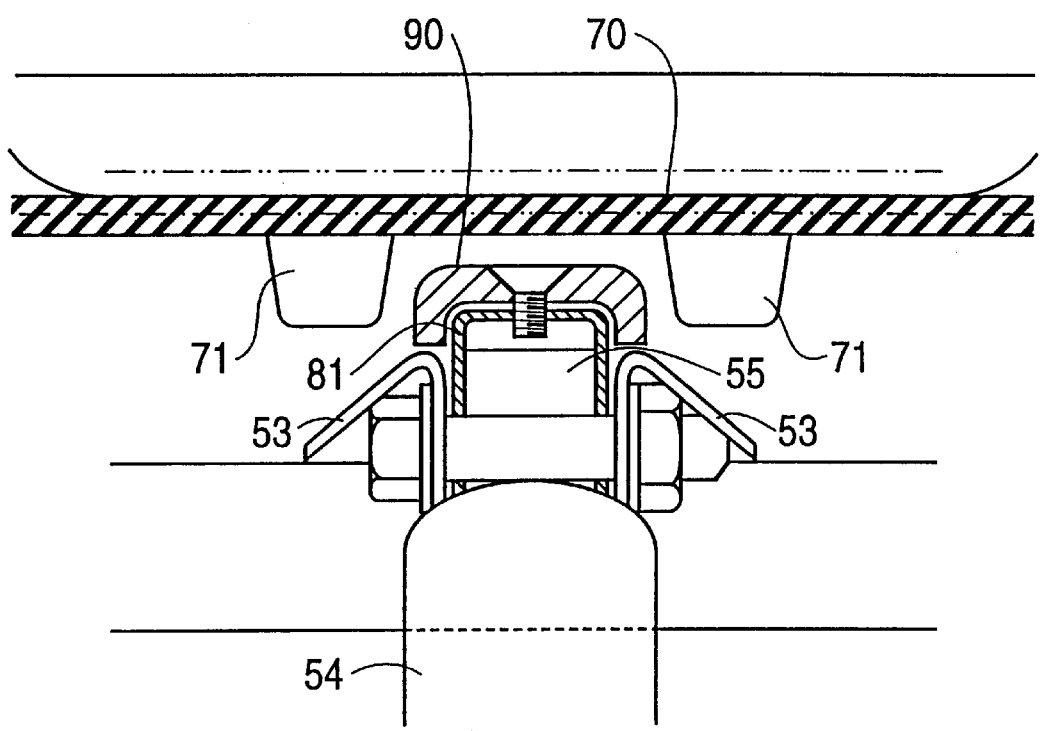
FIG. 11 is a view similar to FIG. 7, showing the modified form of the present invention.
Figure 12:
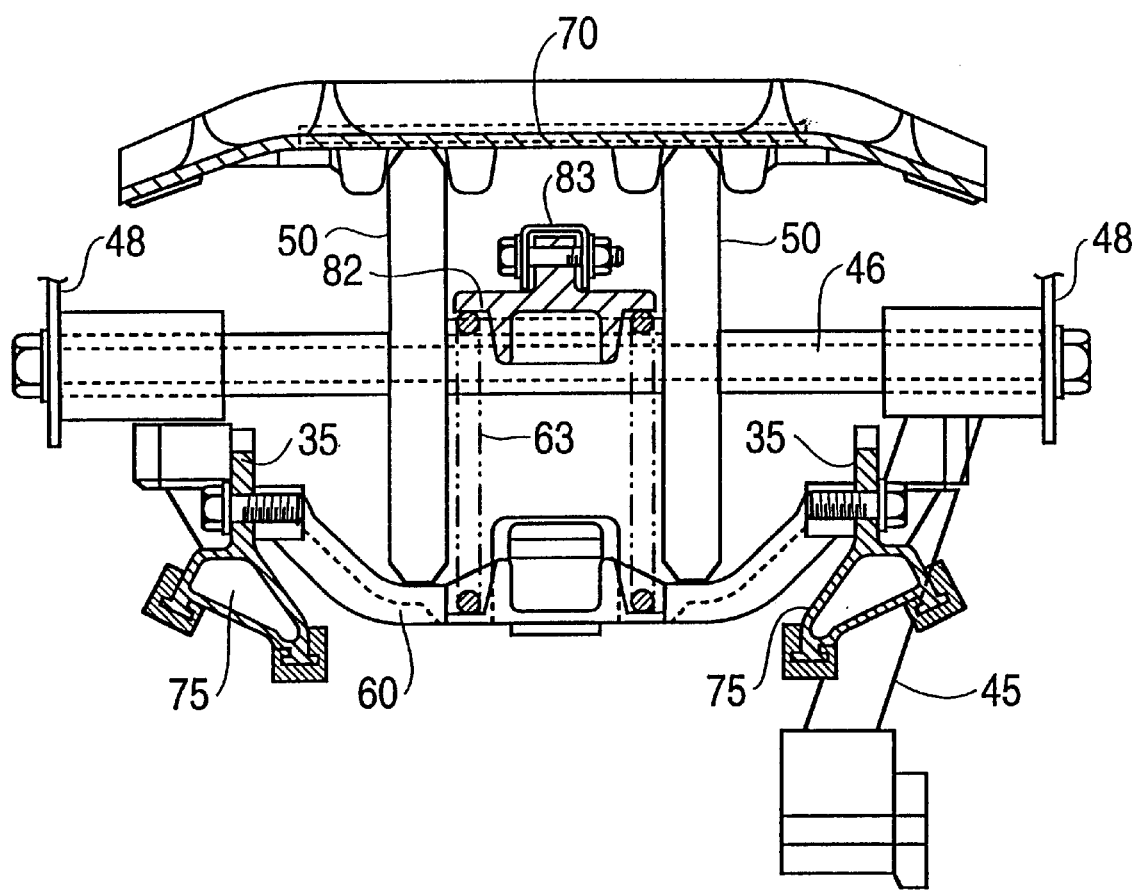
FIG. 12 is a view similar to FIG. 8, showing the modified form of the present invention.

FIG. 4 is a side view of the endless track device 3 in its normal, unloaded condition, FIG. 5 is a side view of the endless track device 3 when it is subjected to a high-load, FIG. 6 is a cross section taken along the line 6—6 in FIG. 4, FIG. 7 is a cross section taken along the line 7—7 in FIG. 4, and FIG. 8 is a cross section taken along the line 8—8 in FIG. 5.

Referring to FIGS. 4–8, the floor 4 is a member having a substantially inverted U-shaped cross section, and the drive shaft 30 is supported at its opposite ends to front end portions of right and left side panels 32 of the floor 4.

A pair of right and left first rear swing arms 33 parallel to each other are pivotally connected at their front ends to a central portion of the drive shaft 30.

The first rear swing arms 33 extend rearward so as to be inclined downward, and the rear ends of the first rear swing arms 33 are pivotally connected to a first idler shaft 34 which is parallel to the drive shaft 30.

The first idler shaft 34 is supported at its opposite ends to front end portions of a pair of right and left side rails 35 extending substantially horizontally in the longitudinal direction. A pair of right and left first idlers 36 are rotatably supported through bearings 37 to a central portion of the first idler shaft 34.

A second idler shaft 39 is supported at its opposite ends within elongated holes 38 formed at rear end portions of the right and left side rails 35. The longitudinal position of the second idler shaft 39 is adjustable within the elongated holes 38 by an adjusting member 40.

A pair of right and left second idlers 42 are rotatably supported through bearings 41 to a central portion of the second idler shaft 39.

A pair of right and left pivot shafts 43 projecting laterally inward are mounted on the inner surfaces of the rear end portions of the right and left side rails 35 in the vicinity of supported portions of the second idler shaft 39. A pair of right and left second rear swing arms 45 are pivotally supported at its lower end through bearings 44 to the pivot shafts 43.

As shown in FIG. 8, the second rear swing arms 45 are substantially parallel to the first rear swing arms 33. The upper ends of the second rear swing arms 45 are pivotally supported through bearings 47 to a central portion of a third idler shaft 46 which is parallel to the drive shaft 30.

The third idler shaft 46 is supported at its opposite ends to a pair of right and left idler brackets 48 projecting downward from the lower ends of the right and left side panels 32 at their substantially central portions. A pair of right and left, third idlers 50 are rotatably supported through bearings 49 to a central portion of the third idler shaft 46.

The front end portion of the floor 4 is provided with a pair of right and left cushion brackets 51 projecting rearward along the inner surfaces of the right and left side panels 32. A cross member 52 extends between the rear ends of the right and left cushion brackets 51.

As shown in FIG. 7, a pair of right and left stays 53 project rearward from a central portion of the cross member 52. An upper end portion 55 of a rear damper 54 is supported between the rear ends of the right and left stays 53.

As shown in FIG. 6, a lower end portion 56 of the rear damper 54 is supported to a stay 61 projecting from a central portion of a cross member 60. The cross member 60 extends between the right and left side walls 35 at their central portions, and is fixedly supported thereto by bolts 57.

A lower spring retaining recess 62 is formed at a central portion of the cross member 60. The lower end of a cushion spring 63 is retained by the lower spring retaining recess 62.

Referring to FIG. 8, the upper end of the cushion spring 63 is supported to an upper spring retaining member 64 mounted on the third idler shaft 46 at its central portion.

In the normal condition shown in FIG. 4, the cushion spring 63 is inclined in a rearward direction so as to form a substantially V-shaped configuration in cooperation with the rear damper 54 which is inclined in a frontward direction. In the compressed condition shown in FIG. 5, the cushion spring 63 is substantially upright (Substantially perpendicular to the side rails 35).

As illustrated in FIG. 8, a pair of right and left rubber stoppers 65 are mounted on the upper surfaces of the right and left side rails 35 in the vicinity of mounted portions of the cross member 60. In the compressed condition shown in FIG. 5, the rubber stoppers 65 abut against the third idler shaft 46 to transmit a reaction force from the snow surface through the side rails 35 directly to the floor 4.

The swings arms 33, 45 pivoting at the drive shaft 30, and first-third idler shafts 34, 39, 36 forms a parallelogram. Furthermore, the damper 54 and cushion spring 63 are arranged in a V-shape with the apex of the V-shape disposed between the first and second idlers 36, 42 in the longitudinal direction of the snowmobile. More particularly, the V-shape formed by the damper 54 and cushion spring 63 is anchored at the base of the parallelogram on a common cross member support 60.

An endless track belt 70 is wrapped around the drive wheels 20, the first idlers 36, the second idlers 42, and the third idlers 50.

The endless track belt 70 is preferably made of rubber, and a plurality of teeth 71 project from the inner circumferential surface of the track belt 70. The teeth 71 are arranged in right and left parallel lines in such a manner that the teeth 71 in each line are spaced from each other so as to nip each of the drive wheels 20, the first idlers 36, the second idlers 42, and the third idlers 50 from their opposite sides.

As shown in FIG. 5, the teeth 71 in each line are in mesh with teeth 72 projecting from opposite side surfaces of each drive wheel 20 which are equally spaced in the drive wheel's circumferential direction, so that the torque of each drive wheel 20 is transmitted to the track belt 70.

As apparent from FIGS. 7 and 8, the endless track belt 70 includes a horizontal portion having the teeth 71 and a pair of right and left inclined portions 73 bent inwardly from the laterally opposite ends of the horizontal portion so as to gradually come away from the snow surface on the lower portion of the track belt 70.

A pair of right and left front side sliders 74 and a pair of right and left rear side sliders 75 are provided so as to come in contact with the right and left inclined portions 73 of the endless track belt 70.

Referring to FIG. 8, the front side sliders 74 are formed integrally with the first rear swing arms 33 so as to project in a downward direction, and the rear side sliders 75 are formed integrally with the side rails 35 so as to project in a downward direction.

The front and rear side sliders 74 and 75 have the same sectional shape which is preferably formed by extrusion of aluminum. As shown in FIGS. 7 and 8, each side slider 74, 75 is bifurcated to form two laterally projecting ends 76 and 77.

The two ends 76 and 77 are connected together by a connecting portion 75a. A resin rail 78 is mounted on each of the two ends 76 and 77 by a bolt 79. The connecting portion 75a connecting the two ends 76 and 77 is inclined so as to be parallel to the corresponding inclined portion 73 of the track belt 70.

Furthermore, a pair of right and left second idlers 42 are rotatably supported through bearings 41 to a central portion of the second idler shaft 39.

A pair of right and left pivot shafts 43 projecting laterally inward are mounted on the inner surfaces of the rear end portions of the right and left side rails 35 in the vicinity of supported portions of the second idler shaft 39. A pair of right and left second rear swing arms 45 are pivotally supported at its lower end through bearings 44 to the pivot shafts 43.

As shown in FIG. 8, the second rear swing arms 45 are parallel to the first rear swing arms 33. The upper ends of the second rear swing arms 45 are pivotally supported through bearings 47 to a central portion of a third idler shaft 46 parallel to the drive shaft 30.

The third idler shaft 46 is supported at its opposite ends to a pair of right and left idler brackets 48 projecting downward from the lower ends of the right and left side panels 32 at their substantially central portions. A pair of right and left third idlers 50 are rotatably supported through bearings 49 to a central portion of the third idler shaft 46.

The front end portion of the floor 4 is provided with a pair of right and left cushion brackets 51 projecting rearward along the inner surfaces of the right and left side panels 32. A cross member 52 extends between the rear ends of the right and left cushion brackets 51.

As shown in FIG. 7, a pair of right and left stays 53 project rearward from a central portion of the cross member 52. An upper end portion 55 of a rear damper 54 is supported between the rear ends of the right and left stays 53.

As illustrated in FIG. 6, a lower end portion 56 of the rear damper 54 is supported to a stay 61 projecting from a central portion of a cross member 60. The cross member 60 extends between the right and left side walls 35 at their central portions, and is fixedly supported thereto by bolts 57.

A lower spring retaining recess 62 is formed at a central portion of the cross member 60, and the lower end of a cushion spring 63 is retained in the recess 62.

As shown in FIG. 8, the upper end of the cushion spring 63 is supported to an upper spring retaining member 64 mounted on the third idler shaft 46 at its central portion.

In the normal condition shown in FIG. 4, the cushion spring 63 is inclined rearward so as to form a substantially V-shaped configuration in cooperation with the rear damper 54 inclined frontward. In the compressed condition shown in FIG. 5, the cushion spring 63 extends substantially upright.

The connecting portion 75a connecting the two ends 76 and 77 is inclined so as to be parallel to the corresponding inclined portion 73 of the track belt 70.

FIGS. 9–13 show a modification of the present invention. In the following description of this modification, parts in common with the previous embodiment will be denoted by the same reference numerals, and only different parts will be described. Furthermore, the perspective of the views shown in FIGS. 9, 10, 11, and 12 illustrating the modification generally correspond to the perspective of the views shown in FIGS. 4, 6, 7, and 8, respectively.

Referring to FIGS. 9–13, a front end portion 81 of an upper spring holder rod 80 is secured together with the upper end portion 55 of the rear damper 54 to the stays 53.

Figure 13:
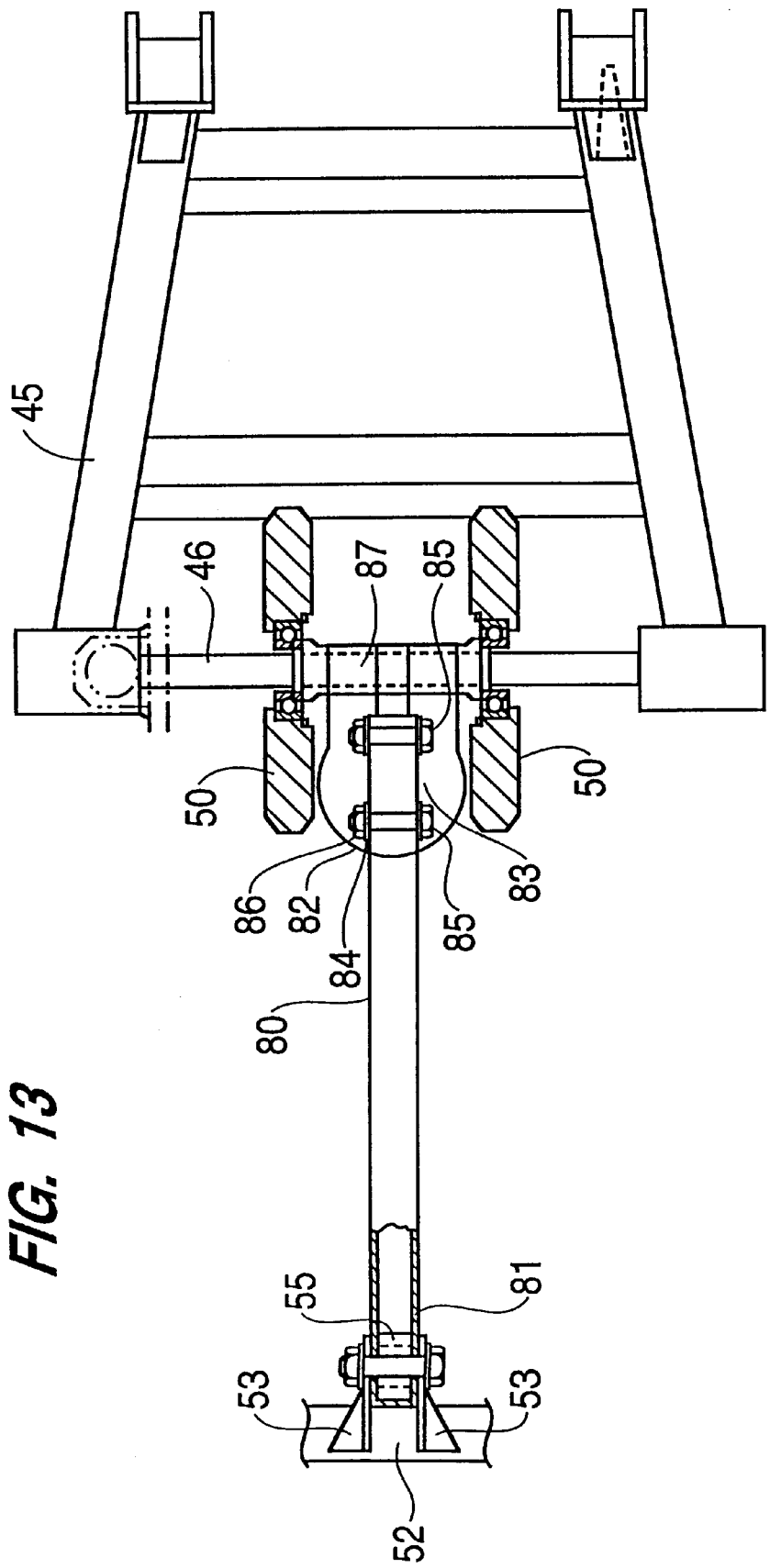
FIG. 13 is a top plan view of an upper member according to the modified form of the present invention.

As apparent from FIG. 13, the upper spring holder rod 80 extends rearward along the lateral center line of the vehicle body, and a rear end portion 83 of the upper spring holder rod 80 is mounted by bolts 85 and nuts 86 to stays 84 projecting upward from the upper surface of an upper spring holder 82.

The upper spring holder 82 supports at its front portion the upper end of the cushion spring 63, and is supported at a rear extending portion 87 to the central portion of the third idler shaft 46.

The upper spring holder rod 80 is inclined downward at its rear portion so as to come away from the track belt 70, and a slider 90 is mounted on the upper surface of a front portion of the rod 80 to guide the track belt 70.

A heat exchanger 91 is provided underneath the floor 4 at a position above the upper spring holder rod 80 to cool hot water from the engine and recirculating it to the engine. The upper surface of the floor 4 is warmed by the heat generated in heat exchange of the heat exchanger 91 to thereby prevent formation and sticking of ice.

Operation of the Invention

The operation of the invention will now be described. The rear damper 54 and the cushion spring 63 which make up the rear cushion device in this invention are separated from each other, and they are linearly arranged along the longitudinal center line of the vehicle body.

Accordingly, in the compressed condition, the cushion spring 63 is positioned substantially upright (substantially perpendicular to the side rails 35). As a result, a maximum load can be most efficiently received by the cushion spring 63 so that the cushion spring 63 can be reduced in weight when compared with the conventional cushion spring.

Furthermore, the invention arranges the rear damper 54 such that it is inclined downward with respect to the front side of the snowmobile and is independent of the cushion spring 63. Accordingly, it is unnecessary to increase the height of the endless track device 3 to accommodate the rear damper 54. The result is a reduced vehicle which lowers the center of gravity and permits sharper turns and better handling.

If the angle of inclination of the rear damper 54 is excessive, the damping efficiency of the rear damper 54 is reduced and, to provide an effective damping action, the rear damper 54 must then be increased in size which results in an increase in weight. Therefore, the angle of inclination of the rear damper 54 is decided by considering the balance between the desired weight and height of the snowmobile.

By providing the upper member 80 as in the modifications shown in FIGS. 9–13, vibrations of the track belt 70 can be received by the upper member 80. Because the amplitude of the track belt 70 vibrations may be large especially at the upper portion of the track belt 70, the upper member 80 effectively suppresses the vibration amplitude.

In addition, because the amplitude of the vibrations of the track belt 70 can be suppressed by the upper member 80, the clearance between the track belt 70 and the heat exchanger 91 can be reduced to thereby further reduce the vehicle height and thereby improve vehicle performance.

Further, the upper spring holder 82 is positioned between the right and left idler brackets 48 near a pivot position of the third idler shaft 46. Accordingly, a load on the cushion spring 63 can be efficiently transmitted to the upper spring holder 82 and thereby to the floor 4 of the snowmobile, thereby further reducing weight.

Although the description above refers to a cushion spring 63, it is to be understood that any resilient member can be substituted for cushion spring 63.

Effect of the Invention

According to the present invention, the damper 54 and the cushion spring 63 of the rear cushion device are separated from each other, and the cushion spring 63 is positioned substantially upright (substantially perpendicular to the side rails 35) when the cushion spring 63 is in its compressed state.

Accordingly, the damper 54 does not need to provide a large damping force to counteract shocks from the snow surface as in the conventional snowmobile. Furthermore, a large angle of inclination for the damper 54 is not required by the invention. Therefore, the invention realizes a compact configuration.

Further, the cushion spring 63 can be positioned as upright as possible, a large spring force is not required of the cushion spring 63, thereby further realizing a compact and light-weight configuration.

Accordingly, an unsprung load can be greatly reduced to thereby also realize an improvement in running performance.

By using a common member as the lower supporting member 60 for the damper 54 and the cushion spring 63, the weight can be even further reduced.

If the rubber stopper 65 is provided on the side rail 35, large loads from the snow surface can be directly transmitted through the rubber stopper 65 to the vehicle body. Accordingly, excessive loads on the cushion spring 63 can be reduced, thereby further improving the compact and lightweight configuration of the cushion spring 63.

If the upper ends of the damper 54 and the cushion spring 63 are separately supported by opposite ends of the upper member 80, the load from the cushion spring can be distributed by the upper member 80 and transmitted to the vehicle body. Accordingly, concentrated loads on the vehicle body can be prevented, thereby contributing to a reduction in weight of the vehicle body.

If the upper surface of the upper member 80 is made flat and the slider 90 is mounted on the flat upper surface of the upper member 80 so as to extend along the inner surface of the upper portion of the track belt 70, vibrations in the upper portion of the track belt 70 can be reduced. Because the vibrations of the track belt 70 are maximum at the upper portion thereof, the support provided by the upper member 80 is highly advantageous.

If the heat exchanger 91 is located above the upper member 80, the track belt 70 can be positioned closer to the heat exchanger 91 because the vibrations of the track belt are suppressed, thereby further reducing the vehicle height.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claim is:

1. A snowmobile, comprising:
   an endless track device having a drive wheel supported by a vehicle body of the snowmobile;
   swing arms pivotally supported at an upper end thereof to the vehicle body;
   a pair of side rails pivotally mounted to a lower end of said swing arms and extending in a longitudinal direction of the vehicle body;
   first and second idlers respectively supported by a front portion and a rear portion of said side rails;
   a third idler supported by the vehicle body;
   a track belt wrapped around said first, second and third idlers and said drive wheel;
   a rear cushion device absorbing a shock from a snow surface, said rear cushion device including a damper and a resilient member wherein said damper is separately provided from said resilient member such that upper ends of said damper and said resilient member are mounted at different locations on the vehicle body,
   said damper inclined in the longitudinal direction of the vehicle body,
   said resilient member inclined in the longitudinal direction of the vehicle body in a non-compressed state and substantially perpendicular to said side rail in a compressed state; and
   a lower supporting member mounted to said side rails, said lower supporting member commonly supporting both a lower end of said damper and a lower end of said resilient member.

2. The snowmobile according to claim 1, said damper and said resilient member forming a V shape with an apex of the V shape disposed between the first and second idlers in the longitudinal direction.

3. The snowmobile according to claim 1, wherein the resilient member is a cushion spring, the snowmobile further comprising:
   a spring retaining recess provided in said lower supporting member, said spring retaining recess keeping said cushion spring centered.

4. The snowmobile according to claim 1, further comprising:
   an upper cross member laterally mounted to the vehicle body,
   wherein an upper end of said resilient member is mounted to said cross member.

5. The snowmobile according to claim 1 wherein said third idler is rotatably supported by an idler shaft and wherein said resilient member is a cushion spring, the snowmobile further comprising:
   an upper spring retaining member mounted to a central portion of the idler shaft,
   said cushion spring having an upper end supported by said upper spring retaining member,
   wherein said upper spring retaining member keeps said cushion spring centered.

6. The snowmobile according to claim 1 wherein said resilient member is a coil spring.

7. The snowmobile according to claim 1, wherein the resilient member is a cushion spring, the snowmobile further comprising:
   an upper member longitudinally mounted at opposite ends thereof to the vehicle body and inside an upper portion of said track belt,
   wherein one end of said upper member pivotally supports an upper end of said damper,
   wherein the other end of said upper member includes a spring retaining portion supporting an upper end of said cushion spring.

8. The snowmobile according to claim 7, wherein said upper member has a flat upper surface, the snowmobile further comprising:
   a slider provided on the flat upper surface of said upper member so as to extend along the inner surface of the upper portion of said track belt,
   wherein said slider guides said track belt and thereby reduces vibrations in said track belt.

9. The snowmobile according to claim 7, further comprising:
   a heat exchanger located above said upper member with the upper portion of said track belt interposed therebetween.

10. A snowmobile, comprising:
    an endless track device having a drive wheel supported by a vehicle body of the snowmobile;
    swing arms pivotally supported at an upper end thereof to the vehicle body;
    a pair of side rails pivotally mounted to a lower end of said swing arms and extending in a longitudinal direction of the vehicle body;
    first and second idlers respectively supported by a front portion and a rear portion of said side rails;
    a third idler supported by the vehicle body;
    a track belt wrapped around said first, second and third idlers and said drive wheel;
    a rear cushion device absorbing a shock from a snow surface, said rear cushion device including a damper and a resilient member wherein said damper is separately provided from said resilient member such that upper ends of said damper and said resilient member are mounted at different locations on the vehicle body,
    said damper inclined in the longitudinal direction of the vehicle body,
    said resilient member positioned substantially perpendicular to said side rail in a compressed state;
    a lower supporting member mounted to said side rails, said lower supporting member commonly supporting both a lower end of said damper and a lower end of said resilient member; and
    a pair of rubber stoppers provided on said pair of side rails, said rubber stoppers abutting against the vehicle body when said resilient member is in the compressed state.

11. A rear suspension for a snowmobile having a vehicle body, the rear suspension comprising:
    swing arms having upper ends pivotally supportable by the vehicle body;
    a pair of side rails pivotally mounted to a lower end of said swing arms and extending in a longitudinal direction of the vehicle body;
    a resilient member having an upper end mountable to the vehicle body, said resilient member positioned substantially perpendicular to said side rail in a compressed state;
    a damper having an upper end pivotally mountable to the vehicle body such that said damper is inclined in the longitudinal direction of the vehicle body; and
    a lower supporting member mounted to said side rails, said lower supporting member commonly supporting both a lower end of said damper and a lower end of said resilient member, wherein said damper is independent from said resilient members, wherein said damper and said resilient member form a V-shape having an apex anchored to said lower supporting member.

12. The rear suspension according to claim 11, wherein said resilient member is a cushion spring, the rear suspension further comprising:

a spring retaining recess provided in said lower supporting member, said spring retaining recess keeping said cushion spring centered.

13. The rear suspension according to claim 11, further comprising:

an upper cross member laterally mountable to the vehicle body, wherein an upper end of said resilient member is mounted to said cross member.

14. The rear suspension according to claim 11, wherein said resilient member is a cushion spring, the rear suspension further comprising:

an upper spring retaining member mountable to a central portion of an idler shaft, said cushion spring having an upper end supported by said upper spring retaining member, wherein said upper spring retaining member keeps said cushion spring centered.

15. The rear suspension according to claim 11, wherein said resilient member is a coil spring.

16. The rear suspension according to claim 11, wherein said resilient member is a cushion spring, further comprising:

an upper member longitudinally mountable at opposite ends thereof to the vehicle body, wherein one end of said upper member pivotally supports an upper end of said damper, wherein the other end of said upper member includes a spring retaining portion supporting an upper end of said resilient member.

17. The rear suspension according to claim 14, wherein said upper member has a flat upper surface, the rear suspension further comprising:

a slider provided on the flat upper surface of said upper member so as to extend along the inner surface of the upper portion of a track belt.

18. A rear suspension for a snowmobile having a vehicle body, the rear suspension comprising:

swing arms having upper ends pivotally supportable by the vehicle body;

a pair of side rails pivotally mounted to a lower end of said swing arms and extending in a longitudinal direction of the vehicle body;

a resilient member having an upper end mountable to the vehicle body, said resilient member positioned substantially perpendicular to said side rail in a compressed state;

a damper having an upper end pivotally mountable to the vehicle body such that said damper is inclined in the longitudinal direction of the vehicle body; and a lower supporting member mounted to said side rails, said lower supporting member commonly supporting both a lower end of said damper and a lower end of said resilient member, wherein said damper is independent from said resilient member, a pair of rubber stoppers provided on said pair of side rails, said rubber stoppers abutting against the vehicle body when said resilient member is in the compressed state.

* * * * *